Patented July 10, 1951

2,559,750

UNITED STATES PATENT OFFICE 2,559,750

AQUEOUS COLLOIDAL DISPERSIONS OF POLYTETRAFLUOROETHYLENE AND THE FORMATION OF SHAPED STRUCTURES THEREFROM

Kenneth L. Berry, Wilmington, Del., assignor to E. I. du Pont de Nemours & Company, Wilmington, Del., a corporation of Delaware No Drawing. Application July 27, 1949, Serial No. 107,136

8 Claims. (Cl. 18—54)

This invention relates to aqueous colloidal dispersions of polytetrafluoroethylene and, more particularly, to such dispersions which are capable of being extruded and coagulated to form shaped structures such as filaments or films.

The outstanding stability of polytetrafluoroethylene to heat, light, solvents, and chemicals makes it a highly desirable material for use in shaped structures such as filaments or films. However, its insolubility in all solvents precludes the use of solution techniques for extrusion and its extraordinarily high melt viscosity makes melt extrusion techniques impractical. Many attempts have been made to prepare filaments or films by extruding and coagulating aqueous colloidal dispersions of polytetrafluoroethylene but these attempts have heretofore been unsuccessful, regardless of whether the starting materials were the dilute dispersions obtainable by conventional polymerization methods in aqueous systems or the highly concentrated, stable dispersions obtainable by the special procedures described in application Ser. No. 695,059, filed by applicant on September 5, 1946, issued as U. S. Patent 2,478,229 on August 9, 1949. Even in the most favorable circumstances, such structures as could be obtained by the extrusion of the prior dispersions were so deficient in tenacity before sintering as to prevent further handling and thus were of no practical use.

An object of this invention is to provide aqueous colloidal dispersions of polytetrafluoroethylene which may be extruded and coagulated to form shaped structures having sufficient tenacity as to be practical to handle. A further object is to provide a process of preparing shaped structures from such dispersions. A more particular object is to provide dispersions which may be extruded and coagulated to form a filament having a tenacity of greater than 25 lbs./sq. in. before sintering. Further objects will be apparent from the description of the invention given hereinafter.

The above objects are accomplished according to the present invention by providing a new aqueous colloidal dispersion of polytetrafluoroethylene in which dispersion substantially all of the particles of polytetrafluoroethylene have at least one dimension less than 0.1 micron and at least 5% thereof have an elongated, ribbon-like shape with a width of less than 0.07 micron and a ratio of length to width greater than 5:1, the dispersion containing at least 5% polytetrafluoroethylene by weight, and forming a shaped structure from such dispersion by extruding the dispersion into a coagulating medium to form the shaped structure, and thereafter sintering said shaped structure at a temperature above 327° C.

It has been found that polytetrafluoroethylene dispersions as characterized above have the unique and unexpected capability of being formed directly into relatively strong structures such as filaments and films by extrusion into a coagulating medium. Upon heating such structures above 327° C., the transition point of polytetrafluoroethylene, at least until the particles have coalesced, i. e., sintered, into a homogeneous structure, as indicated by its transparency, there are obtained strong, flexible, orientable shaped articles. The tenacity of the shaped structures before sintering is far greater than that of extruded dispersions of polytetrafluoroethylene heretofore known, amounting to 25 lbs./sq. in. and upwards, easily sufficient to permit handling of the filament or film.

The aqueous colloidal dispersion of polytetrafluoroethylene preferably contains from 15% to 75%, by weight, of polymer and at least 10% of the polymer particles are of the characteristic elongated, ribbon-like shape; still more preferably, 25% to 50% of the particles are elongated and ribbon-like. Actually, the higher the proportion of the ribbon-like particles, the better adapted is the dispersion for the purposes of this invention. If not appreciably in excess of 15% of the polymer particles are elongated and ribbon-like, then it is preferred that the proportion of polymer be fairly high, i. e., at least 30%, by weight, of polymer. Also, it is preferred that the particles having the ribbon-like shape have a width less than 0.07 micron, a ratio of length to width greater than 10:1, and a cross-sectional area of less than 0.001 square micron. The dimensions of the particles can be estimated by inspection of electron photomicrographs of the dispersion which show clearly that a number of the particles are elongated ribbon-like structures which are apparently rather stiff since they have no appreciable tendency to loop, although they are frequently twisted along the axis. The length of these particles ranges up to 4 to 6 microns or even more and the ratio of length to width may be as high as 400:1 or 600:1 or even higher.

A unique characteristic of the ribbon-like particles present in the dispersions of this invention is that the polymer molecules therein are molecularly oriented along the major axis of the particle. This can be illustrated by allowing a polytetrafluoroethylene dispersion prepared as shown hereinafter to stand undisturbed for several days whereby the ribbon-like particles sediment preferentially from the disperson and can be separated as an aqueous, concentrated dispersion containing substantially only the ribbon-like particles. To align these particles in a more or less parallel arrangement, the concentrate dispersion is flowed through a long capillary tube and the exit end of the tube is immersed in 1% aqueous hydrochloric acid, which coagulates the dispersion in the form of a filament with the particles being set permanently in the more or less parallel arrangement produced by the streamline flow of the dispersion through the capillary. The filament so produced is washed with water and dried. The diffraction pattern obtained by X-raying the filament at right angles to the major axis is characteristic of an oriented fiber. This shows that, even though no cold drawing or other mechanical treatment was performed, the elongated particles contain polytetrafluoroethylene molecules in an oriented configuration. This is believed to be the first observation known to science of such a phenomenon.

In the dispersions of this invention the polymer particles not ribbon-like in shape vary from spheroidal to somewhat elongated in shape. Substantially all of them are less than 0.1 micron even in their greatest dimension, and usually less than 0.05 micron.

The following examples wherein all proportions are by weight unless otherwise noted, illustrate specific embodiments of the invention.

Example I

An aqueous polytetrafluoroethylene dispersion was prepared by heating at 65° C.–70° C. with agitation for 13 hours a solution in 100 parts of water of 2 parts of the sodium salt of the mixture of acids $H(CF_2)_nCOOH$ where $n$ has an average value of 10.6, as a dispersing agent, and 0.025 part of ammonium persulfate as a polymerization catalyst, under a tetrafluoroethylene pressure of 55 lbs./sq. in. The resulting dispersion contained 47 parts of polytetrafluoroethylene. As shown by electron photomicrographs, the polymer particles were exceedingly small, having at least one dimension less than 0.1 micron, and 90% of them were between 0.03 and 0.05 micron in their greatest dimension. A substantial proportion of them of the order of 5% to 10% were elongated, ribbon-like structures less than 0.07 micron in width with a length to width ratio exceeding 5:1.

This dispersion was flowed from a spinneret of approximately 0.01 inch in diameter under the surface of a coagulating bath consisting of an approximately 0.5% solution of hydrogen chloride in water at 25° C. The dispersion coagulated within 3 inches of bath travel to a gelatinous filament which was conducted from the bath into air where it was dried. The dried filament which had a tenacity of about 70 lbs./sq. in., was then heated by contact with a hot metal surface in the range of 327° C.–400° C. for a period between ½ and 1 second until it had changed from translucent to transparent, and then cooled rapidly by passing into water at room temperature. The resulting filament was cold drawn approximately four times its initial length, giving a round transparent filament approximately 0.003–0.004 inch in diameter. This filament showed high orientation along the major axis by X-ray diffraction. It had tensile strength of 14,000 lbs./sq. in. with an elongation of 80% before breaking.

Example II

A portion of the aqueous polytetrafluoroethylene dispersion used in Example I was extruded from a narrow capillary tube into a closed chamber at about 25° C., the air in the chamber containing about 25% hydrogen chloride. The dispersion coagulated into a gel filament which coiled at the bottom of the chamber. Portions of the filament were dried in air at room temperature for about 10 minutes. Other portions were first washed in water, then in acetone, and finally air-dried. The tenacity of the dry filament was in the range of 50 to 100 lbs./sq. in. The dried filaments were heated at about 385° C. for a few minutes and then quenched in cold water. The resulting filaments were readily cold-drawable to yield strong, oriented filaments.

Example III

An aqueous polytetrafluoroethylene dispersion containing 37% polymer and 0.9%, based on the polymer, of ammonium hexadecafluorononanoate used as a dispersing agent, and in which dispersion approximately 10% to 20% of the particles were elongated ribbon-like structures with a width of less than 0.07 micron and a length to width ratio above 5:1, was extruded from an orifice about 0.02 inch in diameter into an aqueous bath at 20° C. containing 2.5% potassium sulfate and 2.5% sulphuric acid. The dispersion coagulated within one inch of the orifice and the gelatinous filament was conducted from the coagulating bath into a water rinsing bath, then dried at 75° C. for three minutes. The tenacity of the filament was in the range of 50 to 100 lbs./sq. in. The filament was then heated at 385° C. on a metal surface for a few seconds and quenched in water at 20° C. to 25° C. The resulting translucent filament was then cold drawn to a strong, pliable oriented filament.

Example IV

An aqueous dispersion of polytetrafluoroethylene containing 48% polymer and 3%, based on the polymer, of ammonium hexadecafluorononanoate used as a dispersing agent, and having a substantial proportion of the order of 10% to 20% of ribbon-shaped particles with a width less than 0.07 micron and an average length of above 0.5 micron, was forced through a spinneret hole having a diameter of 0.02 inch into 5% aqueous hydrochloric acid at 20° C. to 25° C. The length of travel through the coagulating bath was 10 inches and the rate of travel was about 15 feet per minute. The coagulated filament was pulled continuously from the bath by means of a rotating drum and was then passed through two vertical heated columns. The first of these columns, which served to dry the filament, was 15 inches long and 1.5 inches in diameter and operated at an air temperature of 200° C. The second column, immediately below the first, was 8 inches long and 2 inches in diameter and was operated at a temperature of 525° C. At the travel rate of 15 feet per minute this heating zone raised the temperature of the filament above 327° C. as indicated by its becoming transparent. The filament passed directly from the second column into a water quenching bath from which it was withdrawn and wound up continuously. There was obtained a tough, uniform filament which could be drawn 400% of its initial length to give a strong, clear filament having a diameter of 7 mils. The tensile strength of this filament was 14,000 lbs./sq. in. at 80% elongation.

Example V

A stirred autoclave was charged with 2,000 parts of distilled water, 50 parts of ammonium eicosafluoroundecanoate, $H(CF_2)_{10}COONH_4$, as the dispersing agent, one part of ammonium persulfate as the polymerization catalyst, and 100 parts of paraffin having a melting point of 56° C.–58° C. as a stabilizer. The solution was brought to a temperature of 79° C. and tetrafluoroethylene gas was charged in at a pressure of 50–100 lbs./sq. in. Polymerization was carried out for 4 hours at that temperature and pressure and there was obtained a polytetrafluoroethylene dispersion containing 15.7% polymer in which a large portion of the particles, of the order of 25% to 35%, were in the form of elongated ribbon-like structures. Most of these elongated particles were very long, up to 4 or 5 microns or longer and the ratio of length to width was greater than 10:1 and in most instances far exceeded this. These particles did not exceed 0.07 micron in width.

This dispersion was extruded from an orifice 0.02 inch in diameter into a 5% aqueous hydrochloric acid bath at 25° C. The resulting filament was removed from the bath and dried for several hours at room temperature, giving a flexible filament with the remarkable tenacity of about 1,000 lbs./sq. in. before sintering. The filament was then sintered on a metal surface at 385° C. for a few seconds, then quenched in water at 25° C. The resulting homogeneous filament was cold-drawable to a clear, oriented, strong filament.

Example VI

An aqueous dispersion of polytetrafluoroethylene containing 47% polymer and 2%, based on the polymer, of potassium hexadecafluorononanoate as a dispersing agent, and having a large proportion of ribbon-shaped polymer particles as described in Example IV was extruded through a slit 10 mils wide and ⅜ inch long into aqueous 5% hydrochloric acid at 20° C.–25° C., wherein it coagulated immediately to form a gel tape. The tape was dried at 50° C., heated at 365° C. for about 30 seconds, and quenched in water. There was thus obtained a strong, flexible tape about 20 mils thick, and one inch wide. This tape could be cold drawn to several times its original length.

Example VII

An aqueous polytetrafluoroethylene dispersion containing 50% polymer and 2%, based on the polymer, of potassium hexadecafluorononanoate as a dispersing agent, and in which a number of the polymer particles well exceeding 5%, had the ribbon-like shape already described, was extruded through an orifice 0.02 inch in diameter into 1% hydrochloric acid at 20° C.–25° C. The resulting monofilament was removed from the coagulating bath and passed through an aqueous solution of ferric nitrate. After several minutes of contact the filament was uniformly impregnated with ferric nitrate. It was then removed and dried at room temperature, then heated on a metal surface at 385° C. for a few seconds and subsequently quenched in water. The resulting filament was cold drawable to a strong, oriented filament having a deep, transparent, red color uniformly distributed through the filament.

Example VIII

The dispersion used in Example VII was extruded and coagulated in the same manner and the gel filament resulting was led into a bath of aqueous lead nitrate. After a few minutes contact, the impregnated filament was immersed in an aqueous solution of potassium chromate. An insoluble precipitate of lead chromate formed immediately within the gel structure and was not removed upon washing the gel filament with water. The filament was dried and treated as in Example VII to yield a cold drawable filament having a bright yellow color uniformly distributed therethrough.

Example IX

A gel filament prepared as described in Example VII was removed from the coagulating bath, washed in 50% sulfuric acid, and immersed in a solution of chlorinated copper phthalocyanine in concentrated sulfuric acid. After a few minutes contact the impregnated filament was led from the dye bath into a water bath where the acid diffused from the gel structure, leaving the water-insoluble dye. The dyed filament was dried and treated as in Example VII to yield a cold drawable filament having a transparent, uniformly distributed green color. Exposure of 100 hours to the light of a carbon arc produced no noticeable change in the color.

Example X

A gel filament prepared as described in Example VII was removed from the coagulating bath, washed in 50% sulfuric acid, and immersed in a solution of a violet vat dye, then concentrated sulfuric acid. The dye impregnated filament was treated as in Example IX except that the heat-coalescing treatment was accomplished by passing the filament through a column heated at 400° C. There was obtained a filament cold drawable to a strong, oriented, brilliantly dyed filament.

It will be understood that the above examples are merely illustrative and that the present invention broadly comprises the aqueous colloidal dispersions of polytetrafluoroethylene as hereinbefore characterized and the extrusion of such dispersions into a coagulating medium to form a shaped structure and thereafter sintering the shaped structure at a temperature above 327° C.

The present invention is not concerned with the particular manner of preparing the colloidal dispersions. The examples illustrate the preparation of suitable dispersions in accordance with the process disclosed and claimed in applicant's copending application Serial No. 107,137, filed of even date herewith and entitled "Process of Preparing Colloidal Dispersions of Polymeric Tetrafluoroethylene," said application Serial No. 107,137 having been abandoned September 7, 1950 subsequent to the filing of application Serial No. 171,241 on June 29, 1950, a continuation of Serial No. 107,137 and embodying the disclosure of said Serial No. 107,137. In the process of said application dispersions are formed by polymerizing tetrafluoroethylene in aqueous systems in the presence of a water-soluble polymerization catalyst, preferably an organic or inorganic peroxy catalyst, using as a dispersing agent an ammonium or alkali metal salt of a polyfluoroalkanoic acid having the formula $H(CX_2-CX_2)_n-COOH$, wherein X is fluorine or chlorine and at least half of the X's in each $(CX_2-CX_2)$ unit are fluorine and $n$ is an integer from 3 to 10, inclusive. The preferred dispersing agents are the salts of acids having the formula $H(CF_2)_n$—COOH, wherein $n$ is an even number from 6 to 10. To facilitate the preparation of stable dispersions of relatively high polymer concentration, there is also included in the aqueous system, as a stabilizer, 0.1% to 12%, by weight of the water employed, of a saturated hydrocarbon having more than 16 carbon atoms and which is liquid under the polymerization conditions. As shown in Example V, paraffin wax is a preferred hydrocarbon stabilizer. The use of these hydrocarbons as stabilizers in the polymerization of tetrafluoroethylene to obtain an aqueous colloidal dispersion of polytetrafluoroethylene is more fully disclosed and claimed in application Serial No. 107,135, entitled "Polymeric Tetrafluoroethylene Dispersions" filed of even date herewith in the name of S. G. Bankoff and assigned to the assignee of the instant application.

The proportion of polymer particles and, more especially, the shape and size of the particles in the dispersion are critical in obtaining a dispersion which may be extruded into a shaped structure having sufficient tenacity before sintering to be handled practically, i. e., a shaped structure having a tenacity of the order of 25 lbs./sq. in. or greater. The dispersion should contain at least 5% polymer by weight and substantially all of the polymer particles should have at least one dimension less than 0.1 micron. It is very important that no less than 5% of the particles be of the characteristic elongated, ribbon-like structure hereinbefore described. That is, 5% or more of the particles should have a width less than 0.07 micron and a ratio of length to width greater than 5:1 and, preferably, greater than 10:1.

To a large extent it appears that the tenacity of the shaped structures extruded from these dispersions is due to the presence in appreciable proportions of these characteristic ribbon-like polymer particles in the dispersion. The prior art dispersions of polytetrafluoroethylene in which the polymer particles are substantially all spheroidal, cannot be extruded to give a film or filament having any appreciable tenacity even when the particles are of very small size of the order 0.1 micron or less. Even when these prior dispersions contain some rod-shaped particles such as photomicrographs reveal is the case with the suspensions prepared according to the disclosure in applicant's aforementioned U. S. Patent 2,478,229, useful extruded structures cannot be obtained since the gel structures before sintering are very weak and break immediately into short lengths. The rod-like particles of such dispersions have diameters considerably above 0.07 micron and a ratio of length to width of 3:1 and lower.

While dispersions prepared in accordance with applicant's previously mentioned copending application Serial No. 107,137 filed of even date herewith will invariably contain some proportion of the characteristic ribbon-shaped particles, not all of these dispersions will be suitable for extruding filaments or films; some of them will not be dispersions coming within the scope of this invention. To illustrate, a suspension was prepared by stirring a solution of 6.75 parts of ammonium hexadecafluorononanoate and one part of potassium persulfate in 2,000 parts of distilled water containing 100 parts of paraffin wax having a melting point of about 56° C. suspended therein, at 70.5° C. with tetrafluoroethylene at a pressure of 300–350 lbs./sq. in. for 1.1 hours. The resulting dispersion contained 43% solids. It contained rod-shaped particles but had only a small number, of the order of 1% to 3%, of the herein characterized ribbon-like particles with a length to width ratio above 5:1 and a width of less than 0.07 micron. When this dispersion was extruded as in Example V, the coagulated filament was so weak that not more than six to eight-inch lengths could be lifted from the bath before the filament would break. Short segments of filament were dried at room temperature but the dried gel crumbled when handled and no tenacity measurements could be made. In this dispersion the proportion of ribbon-like polymer particles was too low and this accounted for the extremely low tenacity of the extruded filament.

The factors governing the presence or absence of a sufficient proportion of the elongated, ribbon-like particles in dispersions made in accordance with the teaching of applicant's application filed of even date herewith are chiefly the amount of dispersing agent, the nature and quantity of polymerization catalyst, the polymerization temperature and the tetrafluoroethylene pressure. Generally speaking, polytetrafluoroethylene dispersions having the required proportion of ribbon-like particles for good extrudability may be prepared by using aqueous media containing from 0.5–3% of the polyfluoroalkanoate dispersing agent and 0.01%–1% of ammonium persulfate and carrying out the polymerization at a temperature of 40° C.–80° C. and a tetrafluoroethylene pressure of 40–350 lbs./sq. in. However, the dispersions of this invention may be made directly under other conditions using salts of polyfluoroalkanoic acids as dispersing agents and, in any event, it is not necessary to make the dispersions directly in the course of polymerizing the tetrafluoroethylene. For example, a dispersion having less than 5% of the ribbon-like particles may be prepared and allowed to stand undisturbed for several days during which time the ribbon-like particles will sediment preferentially and thus may be separated as a concentrated dispersion in which well over 5% of the polymer particles are of the characteristic ribbon-like shape.

The dispersions of this invention when made in accordance with applicant's application Serial No. 107,137 will contain, as the dispersing agent, an ammonium or alkali metal salt of a ployfluoroalkanoic acid of the type herein above described. The proportion of dispersing agent is not sharply critical and may vary, for example, from 0.01% to 10% by weight of the aqueous medium (water). Since the presence of 0.5%–3%, by weight of the aqueous medium, of these dispersing agents in the aqueous medium during the polymerization of the tetrafluoroethylene favors the formation of the required proportion of ribbon-like polymer particles in the dispersion, such amounts of dispersing agent commonly will be present in the polymer dispersion.

In the process of this invention to obtain shaped structures such as filaments, tapes, films, and the like, the aqueous colloidal dispersion of polytetrafluoroethylene is extruded through a spinneret, or similar device, into a medium which coagulates the dispersion. If the dry spinning process is used, the coagulating medium is gaseous, e. g., an acidic gas such as air containing sulfur dioxide, hydrogen chloride or hydrogen fluoride, or a gas such as air or carbon dioxide which may be at room temperature but is preferably at such a temperature, e. g., between 120° C. and 300° C., that the water is evaporated substantially instantaneously leaving the gel structure.

Preferably, a liquid coagulating bath is used for coagulating the extruded dispersion. This may be any aqueous solution which insolubilizes the dispersing agent and thus inactivates it. The preferred coagulating liquid, particularly for those dispersions containing a salt of a polyfluoroalkanoic acid, is water to which has been added from 0.1% to 25% of any inorganic or organic acid having a dissociation constant of at least $1 \times 10^{-2}$ such as hydrochloric, sulfuric, phosphoric, nitric dichloroacetic, and oxalic acids and the like. The coagulating bath may also be an aqueous solution of an alkali metal salt such as sodium chloride, sodium sulfate, sodium dihydrogen phosphate, sodium acetate, etc. in sufficient concentration to precipitate the dispersing agent; or the bath may contain both a salt and an acid, for example, it can be one of the usual viscose coagulating baths containing sulfuric acid and sodium sulfate.

The coagulating bath may be at ordinary temperature, e. g., 15° C.–30° C., but it may be at any desired temperature above its melting point, e. g., between −10° C. and 120° C. In general, more rapid coagulation occurs in a hot bath and the preferred range for the coagulating bath is 25° C.–100° C. The length of the bath travel need only be sufficient for complete coagulation of the dispersion. Usually, this will be accomplished within 1 to 10 inches of bath travel but this can be increased to any desired length, e. g., up to 200 inches. The required distance of travel through the coagulating bath is an inverse function of the rate of travel and it may be readily determined by noting the gel strength of the coagulated polymer at various rates and distances. It is not necessary to apply in the bath any tension above that required to draw the filament continuously out of or away from the spinneret.

The gel structures obtained by extruding and coagulating the aqueous colloidal dispersions of polytetrafluoroethylene of this invention have a tenacity before sintering higher than 25 lbs./sq. in., usually above 50 lbs., and sometimes as high as 1,000 lbs. Thus, they may be handled readily during the subsequent operations. This property distinguishes them sharply from such gel structures as were sometimes obtainable from the polytetrafluoroethylene dispersions known heretofore which were too weak to withstand handling and hence of no practical utility for extruding into shaped structures.

If wet coagulation is employed, the filament is washed free of coagulant with water and led into air where it is dried, preferably at an elevated temperature of 50° C.–150° C. Washing is not usually necessary if dry coagulation is employed. The drying can also be done in a liquid medium such as acetone or alcohol, and it may be carried out batch-wise or continuously. It can also be combined with the final step of sintering or heat-coalescing the filament.

The filament after coagulation is normally a translucent structure in which the coagulated particles are not homogeneously fused together. The filament is therefore subjected to a sintering or coalescing heat treatment to render it completely homogeneous. This is done by heating the filament above 327° C., the transition point of polytetrafluoroethylene, for a period to coalesce the particles and homogenize the structure to the point where it is capable of being cold drawn. This is achieved when the filament changes from translucent to transparent. The heat treatment may be discontinued when, or soon after, this point is reached although it is sometimes desirable to continue it further to obtain good cold extensibility. In practice, the heating step involves any temperature between 327° C. and 500° C., with a temperature of 327° C.–400° C. preferred. The minimum heating time, i. e., the time required to reach transparency, is readily determined by visual observation; within the range of 327° C.–400° C. it will usually vary between about half a second and four or five seconds, depending upon the temperature. The heating may be extended to about three minutes after transparency is reached but beyond that has no appreciable effect. The heating step is conveniently carried out continuously as by running the filament at the appropriate speed through a tube or chamber maintained at the required temperature.

There is thus obtained a strong, transparent, flexible polytetrafluoroethylene filament. Such a filament can be cold drawn to several times its original length by the techniques developed for nylon fibers. After cold drawing, the filament shows a high degree of orientation along its major axis as indicated by X-ray diffraction pattern. It is substantially circular in cross-section, and it has a remarkably high tenacity.

A similar technique may be applied for the production of films, tapes, ribbons, etc. Alternatively, such pellicular structures may be made by first casting the aqueous polymer dispersion on a plate, a drum or a film of some other material, and coagulating it as described.

A particular advantage of the present invention lies in the fact that it is possible to impregnate the polytetrafluoroethylene gel structure, prior to the heat treatment, with solutions of various solid materials such as dyes, pigments, fillers, reinforcing agents, etc., which solutions can then be precipitated within the gel structure and sealed in by the subsequent heat treatment. This is illustrated in Examples VII to X. The filaments, films, tapes, etc. produced according to this invention are highly porous in the gel state and they absorb readily solutions of solids in water, in liquids miscible with water such as sulfuric acid or water-miscible organic solvents, and in liquids immiscible with water, e. g., nitrobenzene and butyl acetate. It is also practical to use, in place of the above solutions of solids, colloidal dispersions of solids in which the particle size does not exceed 0.1 micron, e. g., colloidal silver. The dissolved or dispersed solid may be precipitated within the gel structure either by chemical reaction with a solution of a different material reactive with the first one, or by replacement of the solvent by a non-solvent through diffusion. This results in a gel structure containing a solid uniformly dispersed therethrough, and the heat-sintering treatment locks the solid particles securely and permanently within the shaped article. For example, dyed polytetrafluoroethylene articles so produced are remarkably resistant to washing, laundering, solvent action, heat or light.

As many apparently widely different embodiments of this invention may be made without departing from the spirit and scope thereof, it is to be understood that the invention is not limited to the specific embodiments thereof except as defined in the appended claims.

The invention claimed is:

1. An aqueous colloidal dispersion of polytetrafluoroethylene capable of being extruded and coagulated to form filaments having a tenacity greater than 25 lbs./sq. in. before sintering, substantially all of the particles of polytetrafluoroethylene in said dispersion having at least one dimension less than 0.1 micron, and at least 10% thereof having an elongated, ribbon-like shape with a width of less than 0.07 micron, a ratio of length to width greater than 5:1, and a cross-sectional area of less than 0.001 square micron, said dispersion containing from 15% to 75% polytetrafluoroethylene by weight.

2. An aqueous colloidal dispersion as set forth in claim 1 containing, as a dispersing agent, a salt from the group consisting of the ammonium and alkali metal salts of a polyfluoroalkanoic acid having the formula $H(CX_2-CX_2)_n-COOH$ wherein X is from the group consisting of fluorine and chlorine and at least half of the X's in each $(CX_2-CX_2)$ unit are fluorine and $n$ is an integer from 3 to 10, inclusive.

3. An aqueous colloidal dispersion of polytetrafluoroethylene capable of being extruded and coagulated to form filaments having a tenacity greater than 25 lbs./sq. in. before sintering, substantially all of the particles of polytetrafluoroethylene in said dispersion having at least one dimension less than 0.1 micron, and 25% to 50% thereof having an elongated ribbon-like shape with a width of less than 0.07 micron, a ratio of length to width greater than 10:1, a cross-sectional area of less than 0.001 square micron, and the polymer molecules in each of said elongated ribbon-like shaped particles being molecularly oriented along the major axis thereof, said dispersion containing from 15% to 75% polytetrafluoroethylene by weight.

4. An aqueous colloidal dispersion as set forth in claim 3 containing, as a dispersing agent, a salt from the group consisting of the ammonium and alkali metal salts of a polyfluoroalkanoic acid having the formula $H(CX_2-CX_2)_n-COOH$ wherein X is from the group consisting of fluorine and chlorine and at least half of the X's in each $(CX_2-CX_2)$ unit are fluorine and $n$ is an integer from 3 to 10, inclusive.

5. Process which comprises extruding an aqueous colloidal dispersion of polytetrafluoroethylene as set forth in claim 1, into a coagulating medium to form a shaped structure and thereafter sintering said shaped structure at a temperature above 327° C.

6. Process which comprises extruding an aqueous colloidal dispersion of polytetrafluoroethylene as set forth in claim 1, into an aqueous coagulating bath to form a shaped structure, washing said shaped structure with water and drying, and thereafter sintering said shaped structure at a temperature above 327° C.

7. Process which comprises extruding an aqueous colloidal dispersion of polytetrafluoroethylene as set forth in claim 2, into an aqueous bath containing, by weight, from 0.1% to 25% of an acid having a dissociation constant of at least $1 \times 10^{-2}$, to form a shaped structure, washing said shaped structure with water and drying, and thereafter sintering said shaped structure at a temperature above 327° C.

8. Process which comprises extruding an aqueous colloidal dispersion of polytetrafluoroethylene as set forth in claim 2, into an aqueous bath maintained at a temperature of 25° C. to 100° C. and containing, by weight, from 0.1% to 25% of an acid having a dissociation constant of at least $1 \times 10^{-2}$, to form a filament, washing said filament with water and drying, and thereafter sintering said filament at a temperature above 327° C.

KENNETH L. BERRY.

REFERENCES CITED

The following references are of record in the file of this patent:

UNITED STATES PATENTS

| Number | Name | Date |
|---|---|---|
| 2,478,229 | Berry | Aug. 9, 1949 |